United States Patent
Wang (10) Patent No.: US 11,593,981 B2
(45) Date of Patent: Feb. 28, 2023

(54) METHOD FOR PROCESSING A SCREENSHOT IMAGE, ELECTRONIC DEVICE AND COMPUTER STORAGE MEDIUM

(71) Applicant: ZHANGYUE TECHNOLOGY CO., LTD, Beijing (CN)

(72) Inventor: Yalei Wang, Beijing (CN)

(73) Assignee: ZHANGYUE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/418,363

(22) PCT Filed: Nov. 18, 2019

(86) PCT No.: PCT/CN2019/119261
§ 371 (c)(1),
(2) Date: Jun. 25, 2021

(87) PCT Pub. No.: WO2020/134708
PCT Pub. Date: Jul. 2, 2020

(65) Prior Publication Data
US 2022/0051460 A1    Feb. 17, 2022

(30) Foreign Application Priority Data
Dec. 26, 2018   (CN) .......................... 201811599988.2

(51) Int. Cl.
*G06T 11/60* (2006.01)
*G06F 9/451* (2018.01)

(52) U.S. Cl.
CPC .............. *G06T 11/60* (2013.01); *G06F 9/451* (2018.02)

(58) Field of Classification Search
CPC ....................................................... G06T 11/60
See application file for complete search history.

(56) References Cited

U.S. PATENT DOCUMENTS

| | | | |
|---|---|---|---|
| 9,083,990 B2 | 7/2015 | Lee et al. | |
| 2011/0150433 A1* | 6/2011 | Alexandrov | H04N 19/17 386/355 |
| 2016/0216871 A1* | 7/2016 | Stamatiou | G06F 3/04845 |

FOREIGN PATENT DOCUMENTS

| CN | 106168872 A | 11/2016 |
|---|---|---|
| CN | 106569700 A | 4/2017 |

(Continued)

OTHER PUBLICATIONS

International Patent Application No. PCT/CN2019/119261; Int'l Search Report; dated Feb. 27, 2020; 3 pages.

*Primary Examiner* — Shivang I Patel
(74) *Attorney, Agent, or Firm* — BakerHostetler (57) ABSTRACT

The disclosure discloses a method for processing a screenshot image, electronic device and computer storage medium. The method includes obtaining an image of a current page based on an instruction of screenshotting the current page; determining whether the image comprises content to be removed; in response to a determination that the image comprises the content to be removed, searching for a first element in a first image layer of the current page, the first element in the first image layer corresponding to the content to be removed; determining whether a second element exists in a second image layer based on a predetermined condition, wherein the second image layer is adjacent to the first image layer; and performing a covering processing on the image to cover the content to be removed to obtain a processed image based on a determination result.

17 Claims, 6 Drawing Sheets

(56) References Cited

FOREIGN PATENT DOCUMENTS

| CN | 106775298 A | 5/2017 |
| CN | 106791022 A | 5/2017 |
| CN | 107357505 A | 11/2017 |
| CN | 109710362 A | 5/2019 |
| WO | WO 2016/078390 A1 | 5/2016 |

\* cited by examiner

METHOD FOR PROCESSING A SCREENSHOT IMAGE, ELECTRONIC DEVICE AND COMPUTER STORAGE MEDIUM

CROSS REFERENCE TO RELATED APPLICATION

The present application is the National Stage of International Patent Application No. PCT/CN2019/119261, filed Nov. 18, 2019, entitled "METHOD AND SYSTEM OF AUTOMATIC ANIMATION GENERATION", which claims the priority to Chinese patent application filed with the Chinese Patent Office on Dec. 26, 2018, with application number of 201811599988.2, titled "METHOD FOR PROCESSING A SCREENSHOT IMAGE, ELECTRONIC DEVICE AND COMPUTER STORAGE MEDIUM", the entire contents of which are incorporated herein by reference.

TECHNICAL FIELD

The present disclosure relates to the technical field of image processing, and in particular to a method for processing a screenshot image, an electronic device and a computer storage medium.

BACKGROUND

In terms of information transmission, pictures are often more vivid and visual than text, and information conveyed in pictures is also more intuitive. In web pages or terminal application pages, information conveyed through pictures can be seen everywhere, and applications users also use pictures to share information. Many of the above-mentioned pictures as information carriers are taken from screenshot images of the pages. These screenshot images include the complete contents of the corresponding captured area, but part of the complete contents do not need to be presented to the user. For example, after taking a screenshot image of the playback interface, the obtained screenshot image includes a playback progress bar, the user cannot operate the progress bar, so it doesn't need to present the playback progress bar to the user.

In the prior art, how to deal with the above contents that does not need to be presented in the screenshot image is a problem to be solved.

SUMMARY

In view of the above problem, the present disclosure is proposed in order to provide a method for processing a screenshot image, an electronic device and a computer storage medium that overcome the above problem or at least partially solve the above problem.

According to one aspect of the present disclosure, a method for processing a screenshot image is provided, which includes:

obtaining an image of a current page based on an instruction of screenshotting the current page;

determining whether the image comprises content to be removed;

in response to a determination that the image comprises the content to be removed, searching for a first element in a first image layer of the current page, the first element in the first image layer corresponding to the content to be removed;

determining whether a second element exists in a second image layer based on a predetermined condition, wherein the second image layer is adjacent to the first image layer, and wherein the predetermined condition comprises in a direction perpendicular to the current page, a perpendicular projection area of the first element in the first image layer is located within a perpendicular projection area of the second element in the second image layer; and performing a covering processing on the image to cover the content to be removed to obtain a processed image based on a determination result.

According to another aspect of the present disclosure, an electronic device is provided, which includes: a processor, a memory, a communication interface and a communication bus, wherein the processor, the memory and the communication interface communicate with each other through the communication bus;

wherein the memory is configured to store executable instructions that upon execution cause the at least one processor to perform operations, the operations comprising:

obtaining an image of a current page based on an instruction of screenshotting the current page;

determining whether the image comprises content to be removed;

in response to a determination that the image comprises the content to be removed, searching for a first element in a first image layer of the current page, the first element in the first image layer corresponding to the content to be removed;

determining whether a second element exists in a second image layer based on a predetermined condition, wherein the second image layer is adjacent to the first image layer, and wherein the predetermined condition comprises in a direction perpendicular to the current page, a perpendicular projection area of the first element in the first image layer is located within a perpendicular projection area of the second element in the second image layer; and performing a covering processing on the image to cover the content to be removed to obtain a processed image based on a determination result.

According to further another aspect of the present disclosure, a non-volatile computer-readable storage medium is provided, in which at least one executable instruction is stored, wherein the executable instruction is configured to cause a processor to perform the following operations:

obtaining an image of a current page based on an instruction of screenshotting the current page;

determining whether the image comprises content to be removed;

in response to a determination that the image comprises the content to be removed, searching for a first element in a first image layer of the current page, the first element in the first image layer corresponding to the content to be removed;

determining whether a second element exists in a second image layer based on a predetermined condition, wherein the second image layer is adjacent to the first image layer, and wherein the predetermined condition comprises in a direction perpendicular to the current page, a perpendicular projection area of the first element in the first image layer is located within a perpendicular projection area of the second element in the second image layer; and performing a covering processing on the image to cover the content to be removed to obtain a processed image based on a determination result.

According to yet another aspect of the present disclosure, a computer program product is further provided, which includes a computer program stored on the above described non-volatile computer-readable storage medium.

In the method for processing a screenshot image, the electronic device and the computer storage medium according to the present disclosure, after an image of a current page is obtained, if it is determined that the image comprises content to be removed, a first element in the first image layer corresponding to the content to be removed is searched for in a current page; and then it is determined whether a second element exists in a second image layer based on a predetermined condition, and special hierarchical relationship and positional relationship between that second element and the first element enable to achieve complete covering of the content to be removed by only using that second element; on the basis of this, by performing a covering processing on the image to cover the content to be removed based on a determination result, the display of the content to be removed can be hidden. It can be thus seen that, in the solution of the present embodiment, after determining that the image comprises the content to be removed, by performing a covering processing on the image to cover the content to be removed to realize the hiding of the content to be removed, presenting of the content to be removed to the user can be avoided; and according to the results of determining whether a second element exists in the current page, a corresponding element is selected to perform the covering processing, instead of directly rearranging all the elements in the current page every time, which simplifies the processing flow and improves the processing effectiveness.

Only the summary of the technical solutions of the present disclosure is described above. In order to enable the clearer understanding of the technical means of the present disclosure to be implemented according to the contents of the specification, and in order to make the above and other objects, features and advantages of the present disclosure clearer and easier to be understood, specific embodiments of the present disclosure will be described hereinafter.

BRIEF DESCRIPTION OF THE DRAWINGS

By reading the following detailed description of preferred embodiments, various other advantages and benefits will become clear to those ordinary skilled in the art. Drawings are only used for the purpose to illustrate the preferred embodiments, and are not to be considered as the limitation of the present disclosure. And throughout the drawings, the same components are represented by the same reference numeral. In the drawings.

DETAILED DESCRIPTION

Hereinafter, exemplary embodiments of the present disclosure will be described in more detail with reference to the accompanying drawings. Although the drawings show the exemplary embodiments of the present disclosure, it should be understood that the present disclosure can be implemented in various forms and should not be limited by the embodiments set forth herein. On the contrary, these embodiments are provided to enable a more thorough understanding of the present disclosure and a full conveying of the scope of the present disclosure to those skilled in the art.

Figure 1:
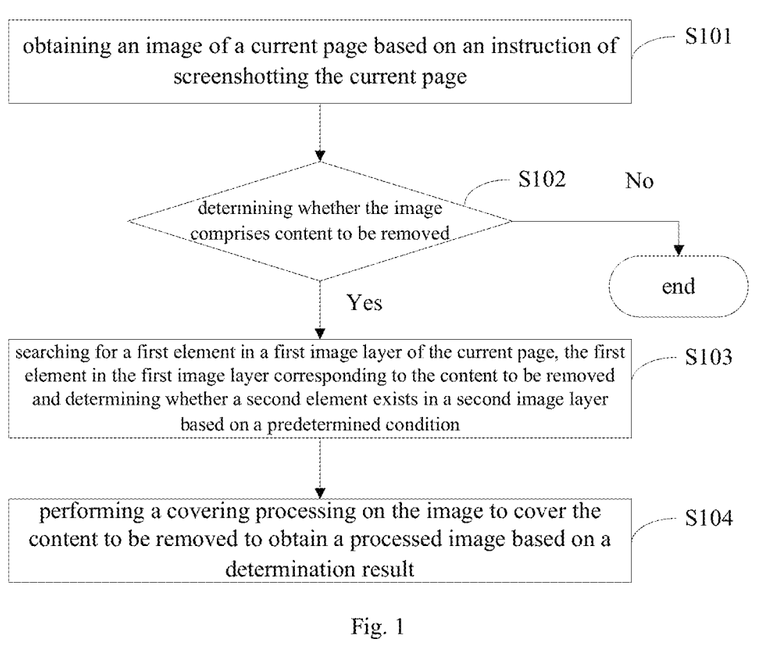
FIG. 1 shows a flowchart of a method for processing a screenshot image according to an embodiment of the present disclosure.

FIG. 1 shows a flowchart of a method for processing a screenshot image according to an embodiment of the present disclosure. As shown in FIG. 1, the method includes the following steps.

Step S101: obtaining an image of a current page based on an instruction of screenshotting the current page The instruction of screenshotting the current page may be initiated by a user performing a screenshot operation, or may also be automatically initiated by a terminal according to a current requirement, for example, if the user clicks a share page button, the terminal automatically initiates the instruction of screenshotting the current page, to obtain an image of a current page.

Specifically, the screenshot operation will be performed on the current page based on the instruction of screenshotting a current page, to obtain an image of the current page. The instruction of screenshotting a current page may be an instruction to take a screenshot image of the entire current page, or an instruction to take a screenshot image of a partial area of the current page, which is not specifically limited by the present disclosure.

Step S102: determining whether the image comprises content to be removed; if yes, step S103 will be performed; otherwise, the present method ends Specifically, it is determined whether the image includes the content to be removed, wherein the content to be removed is the content that does not need to be displayed in the image. And the present disclosure does not specifically limit the manner of determining in this step. In specific implementation, those skilled in the art can make flexible determinations according to the contents of the image and at least one of page elements included in the current page as the source of the image.

Step S103: searching for a first element in a first image layer of the current page, the first element in the first image layer corresponding to the content to be removed and determining whether a second element exists in a second image layer based on a predetermined condition, wherein the second image layer is adjacent to the first image layer The first element refers to an element in the current page which includes the content to be removed.

The purpose of the present disclosure is to hide displaying of the content to be removed. Specifically, according to position and hierarchical information (that is, information on the image layer where an element is located) of each element in the current page, positional relationship and hierarchical relationship between each element and the first element will be determined, and according to this then it will be determined whether a second element exists in the current page, so as to determine covering processing strategy for the content to be removed according to the result of the determination. The first element and the second element have the following relationship. First, hierarchical relationship; the second element is located in the second image layer that is adjacent to the first image layer, more specifically, the second element is located in a lower image layer of the first image layer. Second, positional relationship. A preset condition will be met between the second element and the first element, and the preset condition specifically refers to that, in a direction perpendicular to the current page, a perpendicular projection area of the first element is located within a range of perpendicular projection area of the second element. In other words, the second element is located in the lower image layer of the first image layer, and the second element completely "covers" the first element. It should be noted here that the "cover" here only refers to an inclusion relationship on the perpendicular projection area, and does not refer to the occlusion between image layers (for example, the upper image layer overlays the lower image layer).

For example, if the first element is located in an image layer above other image layer in which other element exists, and the first element is a rectangular picture located in the center of the screen, and the other element is another rectangular picture that is as large as the screen, it can be considered that the other element completely "covers" the first element.

Step S104: performing a covering processing on the image to cover the content to be removed to obtain a processed image based on a determination result Specifically, the result of the determination includes existence of the second element or absence of the second element. When the second element exists, it can be determined that a complete covering of the content to be removed can be achieved by using that second element only, and when the second element does not exist, it can be determined that multiple elements in image layers under the first image layer are needed to achieve a complete covering of the content to be removed. On the basis of this, a covering processing will be performed according to the result of the determination to hide the content to be removed in the image.

In the method for processing a screenshot image provided according to the present embodiment, after an image of a current page is obtained, if it is determined that the image comprises content to be removed, a first element in the first image layer corresponding to the content to be removed is searched for in a current page; and then it is determined whether a second element exists in a second image layer based on a predetermined condition, and special hierarchical relationship and positional relationship between that second element and the first element enable to achieve complete covering of the content to be removed by only using that second element; on the basis of this, by performing a covering processing on the image to cover the content to be removed based on a determination result, the display of the content to be removed can be hidden. It can be thus seen that, in the solution of the present embodiment, after determining that the image comprises the content to be removed, by performing a covering processing on the image to cover the content to be removed to realize the hiding of the content to be removed, presenting of the content to be removed to the user can be avoided; and according to the results of determining whether a second element exists in the current page, a corresponding element is selected to perform the covering processing, instead of directly rearranging all the elements in the current page every time, which simplifies the processing flow and improves the processing effectiveness.

Figure 2:
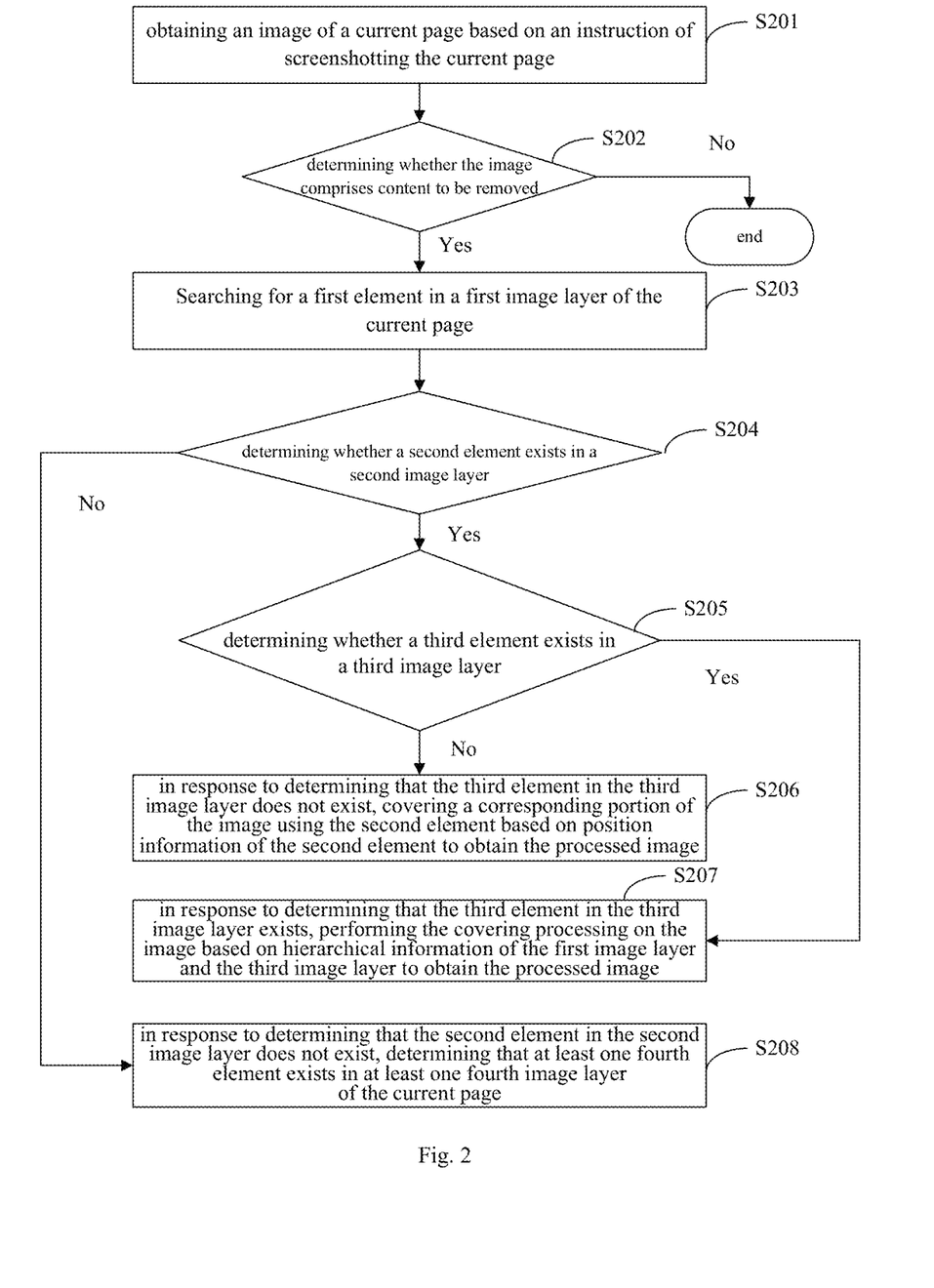
FIG. 2 shows a flowchart of a method for processing a screenshot image according to another embodiment of the present disclosure.

FIG. 2 shows a flowchart of a method for processing a screenshot image according to another embodiment of the present disclosure. As shown in FIG. 2, the method includes the following steps.

Step S201: obtaining an image of a current page based on an instruction of screenshotting the current page Specifically, in response to the instruction of screenshotting the current page, a screenshot is taken according to the screenshot area specified in the instruction, and the image in the current page which corresponds to the screenshot area, is obtained. For example, the image corresponding to the complete current page is obtained.

Step S202: determining whether the image comprises content to be removed; If yes, step S203 will be performed; otherwise, the present method ends.

The content to be removed is the content that does not need to be displayed in the image. Optionally, the content to be removed is the content corresponding to an operable control in the current page. In the image obtained by screenshotting the current page, a user cannot perform any operation on a control displayed in the image, thus a corresponding control in the image is determined as the content to be removed. In a specific embodiment, the content to be removed is movable content in the current page. Optionally, the movable content is a playback progress bar, such as a playback progress bar for audio, video and other contents.

Specifically, a list of the content to be removed can be preset before the solution of the present embodiment is implemented. In the current page as the source of the image, each page element included in the screenshot area of the current page is matched with the list of the content to be removed. If there is a page element that is successfully matched, it is determined that the image includes the content to be removed, which indicates that there is the content to be removed that need to be hidden, and step S203 will be performed to take measures to hide the display; if there is not a page element that is successfully matched, it indicates that there is no content in the image the display of which needs to be hidden, and the present method ends.

The step S203: searching for a first element in a first image layer of the current page, the first element in the first image layer corresponding to the content to be removed The first element found in the current page is the element that is successfully matched.

Step S204: determining whether a second element exists in a second image layer based on a predetermined condition, wherein the second image layer is adjacent to the first image layer, and wherein the predetermined condition comprises in a direction perpendicular to the current page, a perpendicular projection area of the first element in the first image layer is located within a perpendicular projection area of the second element in the second image layer; if yes, step S205 will be performed; otherwise, step S208 will be performed.

In the current page, from a visual perspective, part of the element contents of the second element is obscured by the first element, and at the same time, the corresponding area of the first element is included within a range of the corresponding area of the second element.

Specifically, first, position and hierarchical information of each element will be obtained by querying page layout information of the current page; then the hierarchical information of each element will be compared with the hierarchical information of the first element, and according to the result of the comparison, it will be determined whether a corresponding element is located in an image layer under and adjacent to the first image layer; and the position of each element will be compared with the position of the first element, and according to the result of the comparison, it will be determined whether the corresponding element completely "covers" the first element. When the results of the above two determination processes are both yes, then it is determined that a second element exists in the current page, and at this time, the step S205 will be executed to perform covering processing according to the second element; and when not both results of the above two determinations processes are yes, then it is determined that the second element does not exist in the current page, and at this time, the step S208 will be executed to performing covering according to multiple elements related to the first element.

Figure 3:
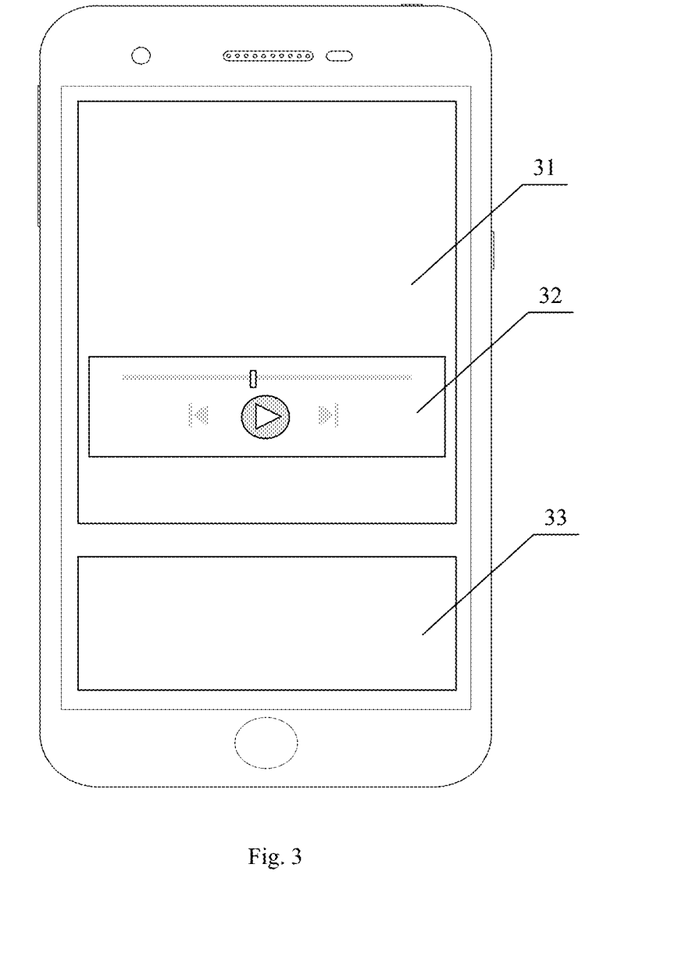
FIG. 3 shows a schematic diagram of a second layer element in a specific embodiment of the present disclosure.

FIG. 3 shows a schematic diagram of a second element in a specific embodiment of the present disclosure. As shown in FIG. 3, the content to be removed are a playback progress control for audio, and when the first element in the current page is an element 32, an element 31 will be determined as a second element by determination and comparison of the position information and the hierarchical information of the elements; and an element 33 does not meet the condition of completely "covering" the element 32, and that element 33 is not a second element. It should be noted here that the number, the position information, or the hierarchical information of the elements of the current page in FIG. 3 are all exemplary, and the present disclosure is not limited to this in specific implementation. For example, the number, the position information, and the hierarchical information of non-second elements are not only one case of the element 33. And the same applies to FIG. 4 and FIG. 5 hereinafter.

Step S205: in response to determining that the second element in the second image layer exists, determining whether a third element exists in a third image layer, wherein the third image layer is located above the second image layer, and wherein the third element and the second element have an overlapping area in the direction perpendicular to the current page; if not, step S206 will be performed, and if yes, step S207 will be performed.

Specifically, when it is determined that a second element exists in the current page, then it indicates that the covering of the content to be removed can be achieved by only using that second element. At the same time, the overlay between image layers will cause obscuration between the corresponding page elements, wherein the upper element will obscure the lower element that has an overlapping area with the upper element. For example, the element 32 in FIG. 3 will obscure the display of the element 31. Thus, in order to avoid the problem that there is missing information in the processed image compared with the current page, which caused by directly covering the corresponding position of the image by using the second element, it is further determined whether a third element exists in the current page. The third element can be understood as an element corresponding to the image content that will be covered by the second element.

Figure 5:
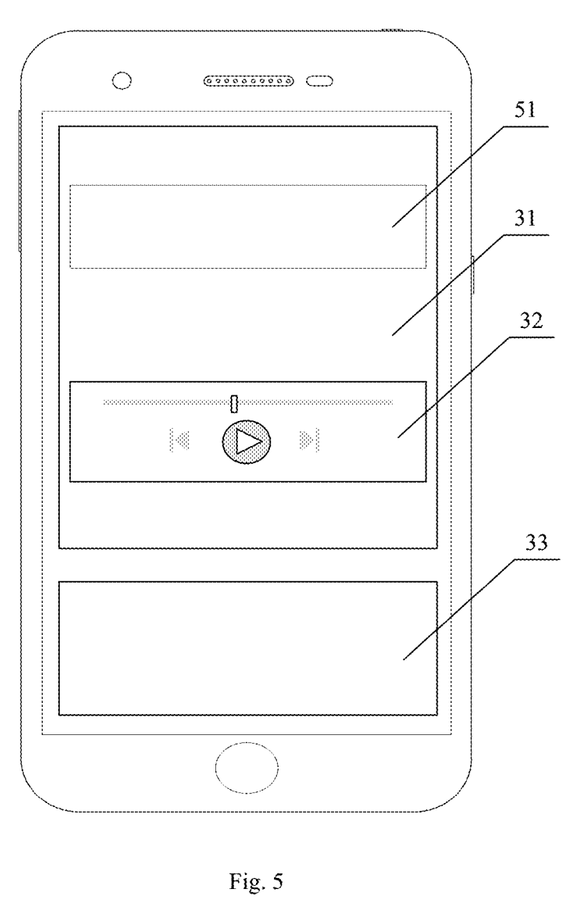
FIG. 5 shows a schematic diagram of a third layer element in another specific embodiment of the present disclosure.

FIG. 5 shows a schematic diagram of a third element in another specific embodiment of the present disclosure. The difference from FIG. 3 is that in FIG. 5, there is an element 51 (i.e. the third element), which is located in an image layer above the image layer where the element 31 (i.e. the second element) is located and has an overlapping area with the element 31 (i.e. the second element) in the direction perpendicular to the current page. When the third element exists, it is obvious that the problem must be considered that the third element will be covered by the second element, and the covering processing cannot be performed by only using the second element.

Further, when it is determined that the third picture element does not exist, the step S206 will be executed to perform covering processing by only using the second element; when it is determined that the third element exists, the step S207 will be executed to perform covering processing by using the second element and the third element, so as to ensure the integrity of the information conveyed by the image.

Step S206: in response to determining that the third element in the third image layer does not exist, covering a corresponding portion of the image using the second element based on position information of the second element to obtain the processed image Specifically, if it is determined that the third element does not exist (FIG. 3 shows this case), it indicates that the covering processing will be performed on the content to be removed by only using the second element, which will not cause obscuration of other contents of the image that need to be displayed. And at this time, the position information of the second element in the current page is to be acquired, and the position information may be information of the edge coordinates of at least one second element. According to the position information, a corresponding position corresponding to the position information will be determined in the image, and then the content to be removed will be covered completely by using the second element. The content to be removed will no longer be displayed in the obtained processed image.

By exemplifying FIG. 3, assume that the coordinates of the four vertices (upper left vertex, upper right vertex, lower right vertex, and lower left vertex) of the element 31 are (a1, b1), (a2, b2), (a3, b3) and (a4, b4), respectively, then the corresponding coordinate positions will be determined in the image, and the covering will be performed by using the element 31 according to the corresponding coordinate positions.

Through this step, the content to be removed in the screenshot image can be covered by only using the second element, to hide the display of the content to be removed, and there is no need to use multiple elements for covering processing, which makes the procedure of the processing easier and more efficient.

Step S207: in response to determining that the third element in the third image layer exists, performing the covering processing on the image based on hierarchical information of the first image layer and the third image layer to obtain the processed image Specifically, if it is determined that a third element exists (FIG. 5 shows this case), it indicates that the second element and the third element need to be extracted at the same time for covering processing, so that the integrity of the information conveyed by the processed image can be ensured while hiding of the display of the content to be removed can be achieved.

Further, since the second element is located in the image layer under and adjacent to the image layer where the first element is located and the third element is located in an image layer above the image layer where the second element is located, the hierarchical information of the first element and the third element is specifically that, the third element is located in an image layer above the image layer where the first element is located, or the third element and the first element belong to the same image layer. Correspondingly, the procedure of the covering processing is specifically as follows: when the third element is located in an image layer above the image layer where the first element is located, or the third element and the first element belong to the same image layer, first, according to the position of the second element, the corresponding position of the screenshot image is covered by using the second element, that is, first, the covering processing is performed on the content to be removed by using the second element located in the lower image layer, so as to complete the obscuration of the content to be removed and hide the display of the content to be removed; then, according to the position of the third element, the corresponding position above the second element is covered by using the third element to obtain the processed image, that is: on the basis of obscuration of the content to be removed, the second element in the screenshot image is covered by other contents that need to be displayed, which are obscured by the second element, so as to enable the information conveyed in the finally obtained image consistent with the information conveyed by the current page.

By exemplifying FIG. 5, the third element is the element 51, and the procedure of the covering processing is specifically as follows: first, according to the position of the element 31 in the current page, the corresponding position of the image is covered by the element 31 to complete the obscuration of the playback progress bar in the image; then according to the position of the element 51 in the current page, the corresponding position above the element 31 in the image is covered by using the element 51 to enable the content of the element 51 to be displayed in the image. It should be noted here that, though the case in which there is only one third element, is explained in the example of FIG. 5, in specific implementation, if there are multiple third elements, the above described correction processing will be performed for each of the third elements.

Through the present step, after the covering processing is performed on the content to be removed in the image by using the second element, the covering processing can be further performed by using the third element to ensure the integrity of the information conveyed by the image.

The above described steps S205 to S207 are all descriptions of the covering processing performed for the case where a second element that completely "covers" the first element exists in the current page. The following steps S208 to S209 are description of the covering processing performed for the case that no second element exists in the current page.

Step S208: in response to determining that the second element in the second image layer does not exist, determining that at least one fourth element exists in at least one fourth image layer of the current page, wherein the at least one fourth element has an overlapping area with the first element in the direction perpendicular to the current page, and wherein the at least one fourth image layer is not a bottom image layer Specifically, when it is determined that second element does not exist, that is, an element that can completely "cover" the first element does not exist in the image layer adjacent to the image layer where the first element is located, then an element (that is, at least one fourth element) related to the first element needs to be determined in the current page, so as to hide the display of the content to be removed by using the related element. And in order to enable the complete hiding of the display of the content to be removed after the covering processing, the related element will be determined in a following way: starting from the image layer which is under and adjacent to the image layer where the first element is located, the element of each image layer is searched for sequentially from the upper to the lower, and the search will not be stopped until at least one element that is found meet a preset termination condition, and the at least one element when the search is stopped will be determined as the at least one fourth element; wherein the preset termination condition is that: in the direction perpendicular to the page, the perpendicular projection area of the first element is located within the perpendicular projection area of the at least one fourth element.

Figure 4:
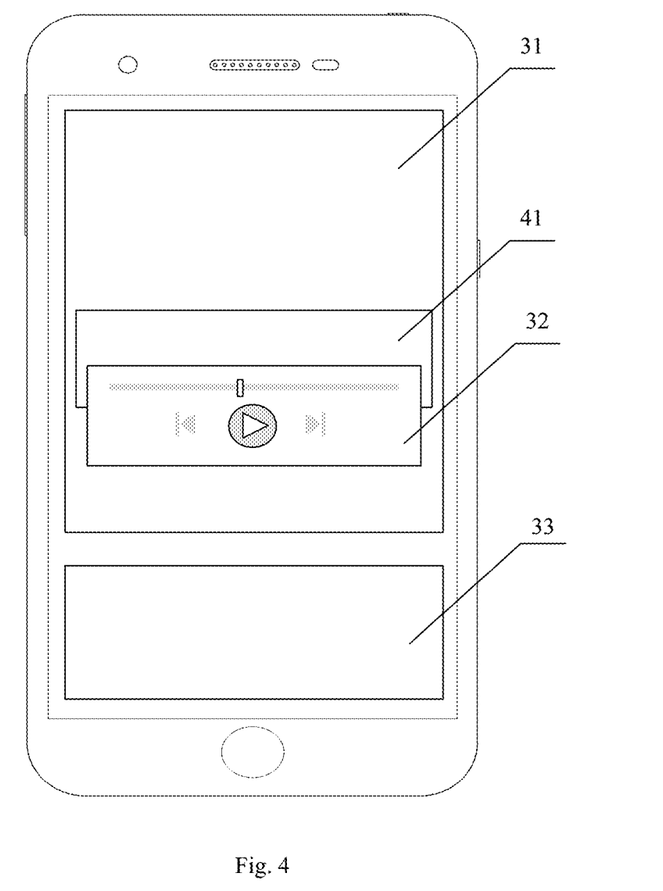
FIG. 4 shows a schematic diagram of at least one fourth layer element in another specific embodiment.

FIG. 4 shows a schematic diagram of at least one fourth element in another specific embodiment. As shown in FIG. 4 and different from FIG. 3, an element 41 in the image layer adjacent to the image layer where the element 32 (that is, the first element) is located does not completely "cover" the element 32. That is the case where the second element does not exist. At this time, starting from the image layer where the element 41 is located, the element of each image layer is searched downward. Then, the element 41 is first found. Obviously, the perpendicular projection of the element 32 does not completely fall within the area of the perpendicular projection of the element 41, which does not meet the preset termination condition; continuing to search downward, the element 31 will be found, and the perpendicular projection of the element 32 falls within the area which is constituted by the perpendicular projections of the element 32 and the element 41 (which are two elements that is found) together, which meets the preset termination condition, and then the search will be stopped and the element 41 and element 31 that are found will be determined as the at least one fourth element. It should be noted that whether the element 33 is the at least one fourth element can be determined according to the hierarchical information of the element 33. For example, if the element 33 is located in the image layer under the image layer where the element 31 is located and the preset termination condition has been met when the element 33 has not been found, the element 33 is not the first element.

In addition, the bottom image layer of the page is usually a background image layer. Generally speaking, in the process of searching for at least one fourth image layer, the bottom image layer is not found when the preset termination condition is met. Correspondingly, in some alternative embodiments, the at least one fourth element is not a bottom image layer.

Through the present step, at least one fourth element can be determined. Because the at least one first element is an element which is searched for from the upper to the lower in accordance with the image layer information and which is found by stopping the search when a preset termination condition is met, the at least one fourth element is usually only part of the elements in the current page, rather than all of the elements.

Step S209: sequentially covering a corresponding portion of the image using the at least one fourth element in an order from a lower layer to an upper layer based on position information of the at least one fourth element and hierarchical information of the at least one fourth image layer to obtain the processed image Specifically, in accordance with the hierarchy information of the at least one fourth element, the fourth element is selected sequentially in an order from the lower to the upper; and the selected fourth element is covered into the image according to its position in the current page to obtain the processed image.

By exemplifying FIG. 4, after determining that the element 41 are the at least one fourth element, in an order of the image layer information from the lower to the upper (the image layer where the element 31 is located is under the image layer where the element 41 is located), the element 31 is first covered into the image according to its position, and then the element 41 is covered into the image according to its position, thereby realizing the complete obscuration of the element 32, and the covering in the order of the image layer information from the lower to the upper can prevent the displayed information of the processed image from being inaccurate due to the confusion of the covering of the image layers.

Through the present step, covering is performed by using at least one fourth element to complete the complete obscuration of the content to be removed; at the same time, the at least one fourth element is usually only a part of the elements of the current page, instead of all of the elements, which can reduce the amount of data processing for covering processing; moreover, the covering processing is performed from the lower to the upper in accordance with the hierarchical information, so that the processed image can convey accurate information; in addition, all of the elements that are found when the preset termination condition is met, are determined as the at least one fourth element, which in turn can avoid the problem of missing information in the processed image.

According to the method for processing a screenshot image provided by the present embodiment, the corresponding covering processing strategy will be determined according to the different results of determination whether a second element exists in the current page. When a second element exists in the current page, it needs to further determine whether a third element exists in the current page according to the overlap between the second element and other elements. If the third element does not exist, the covering processing will be performed by only using the second element, and the obscuration of the content to be removed in the screenshot image can be completed; if a third element exists, the covering processing needs to be performed by using the third element and the second element, to ensure the integrity of the information conveyed by the image while completing the obscuration of the content to be removed; when the second element does not exist in the current page, at least one fourth element is determined and used to perform the covering processing to complete the obscuration of the content to be removed and at the same time to ensure the integrity and accuracy of the information conveyed by the image. It can thus be seen that in the solution of the present embodiment, the obscuration of the content to be removed can be completed by only using a part of the elements to achieve the purpose of hiding of the display of the content to be removed; at the same time, compared to the way of rearranging all elements, the processing efficiency of the solution of the present embodiment is higher; and in the solution of the present embodiment, the integrity and accuracy of the information conveyed by the image are also ensured while the obscuration of the content to be removed is completed.

An embodiment of the present disclosure provides a non-volatile computer-readable storage medium is provided, in which at least one executable instruction is stored, wherein the computer-executable instruction can execute the method for processing a screenshot image in any of the above described method embodiments.

The executable instruction can specifically be configured to cause a processor to perform the following operations:

obtaining an image of a current page based on an instruction of screenshotting the current page;

determining whether the image comprises content to be removed;

in response to a determination that the image comprises the content to be removed, searching for a first element in a first image layer of the current page, the first element in the first image layer corresponding to the content to be removed;

determining whether a second element exists in a second image layer based on a predetermined condition, wherein the second image layer is adjacent to the first image layer, and wherein the predetermined condition comprises in a direction perpendicular to the current page, a perpendicular projection area of the first element in the first image layer is located within a perpendicular projection area of the second element in the second image layer; and performing a covering processing on the image to cover the content to be removed to obtain a processed image based on a determination result.

In an optional embodiment, the executable instruction further causes the processor to perform the following operations:

in response to determining that the second element in the second image layer exists, determining whether a third element exists in a third image layer, wherein the third image layer is located above the second image layer, and wherein the third element and the second element have an overlapping area in the direction perpendicular to the current page; and in response to determining that the third element in the third image layer does not exist, covering a corresponding portion of the image using the second element based on position information of the second element to obtain the processed image.

In an optional embodiment, the executable instruction further causes the processor to perform the following operations:

in response to determining that the third element in the third image layer exists, performing the covering processing on the image based on hierarchical information of the first image layer and the third image layer to obtain the processed image.

In an optional embodiment, the executable instruction further causes the processor to perform the following operations:

in response to determining that the third image layer is located above the first image layer or that the third image layer and the first image layer are in a same layer, covering the corresponding portion of the image using the second element based on the position of the second element, and then covering a corresponding portion of the second element using the third element based on position information of the third element to obtain the processed image.

In an optional embodiment, the executable instruction further causes the processor to perform the following operations:

in response to determining that the second element in the second image layer does not exist, determining that at least one fourth element exists in at least one fourth image layer of the current page, wherein the at least one fourth element has an overlapping area with the first element in the direction perpendicular to the current page, and wherein the at least one fourth image layer is not a bottom image layer; and sequentially covering a corresponding portion of the image using the at least one fourth element in an order from a lower layer to an upper layer based on position information of the at least one fourth element and hierarchical information of the at least one fourth image layer to obtain the processed image.

In an optional embodiment, the content to be removed comprises a movable content in the current page.

In an optional embodiment, the content to be removed comprises a playback progress bar.

Figure 6:
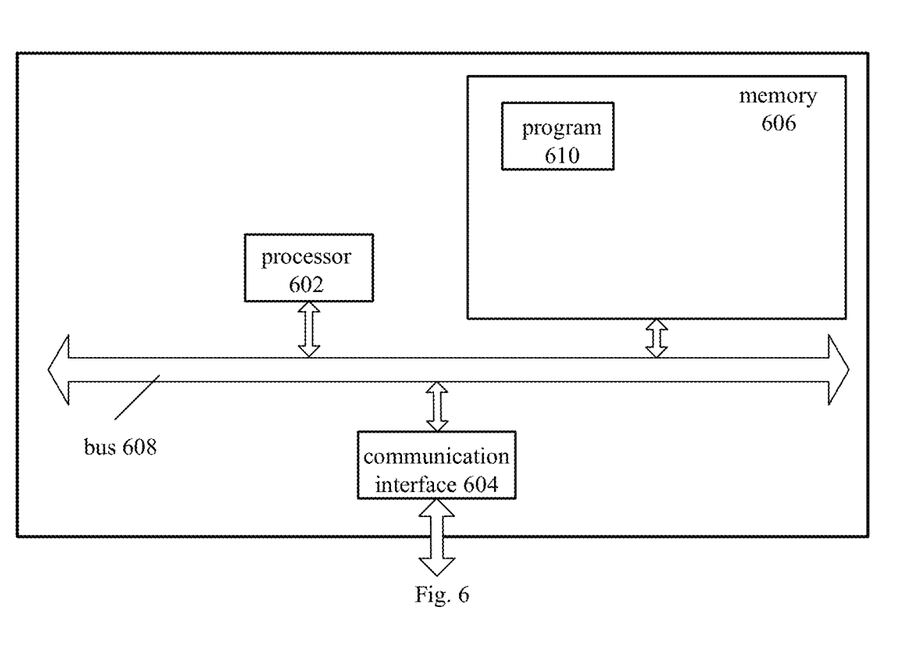
FIG. 6 shows a schematic structural diagram of an electronic device according to an embodiment of the present disclosure.

FIG. 6 shows a schematic structural diagram of an electronic device according to an embodiment of the present disclosure, and the specific embodiment of the present disclosure does not limit the specific implementation of the electronic device.

As shown in FIG. 6, the electronic device may include: a processor 602, a communication interface 604, a memory 606 and a communication bus 608.

Wherein:

The processor 602, the communication interface 604 and the memory 606 communicate with each other through the communication bus 608.

The communication interface 604 is configured to communicate with other devices such as network elements such as clients or other servers.

The processor 602 is configured to execute a program 610, and specifically can execute the relevant steps in the embodiments of the above described method for processing a screenshot image.

Specifically, the program 610 may include a program code, which includes a computer operation instruction.

The processor 602 may be a central processing unit CPU, or an Application Specific Integrated Circuit (ASIC), or one or more integrated circuits configured to implement the embodiments of the present disclosure. The one or more processors included in the electronic device may be the same type of processor, such as one or more CPUs, or may also be different types of processors, such as one or more CPUs and one or more ASICs.

The memory 606 is configured to store the program 610. The memory 606 may include a high-speed RAM memory, and may also include a non-volatile memory such as at least one disk memory.

The program 610 may be specifically configured to enable the processor 602 to perform the following operations:

obtaining an image of a current page based on an instruction of screenshotting the current page;

determining whether the image comprises content to be removed;

in response to a determination that the image comprises the content to be removed, searching for a first element in a first image layer of the current page, the first element in the first image layer corresponding to the content to be removed;

determining whether a second element exists in a second image layer based on a predetermined condition, wherein the second image layer is adjacent to the first image layer, and wherein the predetermined condition comprises in a direction perpendicular to the current page, a perpendicular projection area of the first element in the first image layer is located within a perpendicular projection area of the second element in the second image layer; and performing a covering processing on the image to cover the content to be removed to obtain a processed image based on a determination result.

In an optional embodiment, the program 610 further may be specifically configured to enable the processor 602 to perform the following operations:

in response to determining that the second element in the second image layer exists, determining whether a third element exists in a third image layer, wherein the third image layer is located above the second image layer, and wherein the third element and the second element have an overlapping area in the direction perpendicular to the current page; and in response to determining that the third element in the third image layer does not exist, covering a corresponding portion of the image using the second element based on position information of the second element to obtain the processed image.

In an optional embodiment, the program 610 may be specifically further configured to enable the processor 602 to perform the following operations:

in response to determining that the third element in the third image layer exists, performing the covering processing on the image based on hierarchical information of the first image layer and the third image layer to obtain the processed image.

In an optional embodiment, the program 610 may be specifically further configured to enable the processor 602 to perform the following operations:

in response to determining that the third image layer is located above the first image layer or that the third image layer and the first image layer are in a same layer, covering the corresponding portion of the image using the second element based on the position of the second element, and then covering a corresponding portion of the second element using the third element based on position information of the third element to obtain the processed image.

In an optional embodiment, the program 610 may be specifically further configured to enable the processor 602 to perform the following operations:

in response to determining that the second element in the second image layer does not exist, determining that at least one fourth element exists in at least one fourth image layer of the current page, wherein the at least one fourth element has an overlapping area with the first element in the direction perpendicular to the current page, and wherein the at least one fourth image layer is not a bottom image layer; and sequentially covering a corresponding portion of the image using the at least one fourth element in an order from a lower layer to an upper layer based on position information of the at least one fourth element and hierarchical information of the at least one fourth image layer to obtain the processed image.

In an optional embodiment, the content to be removed comprises a movable content in the current page.

In an optional embodiment, the content to be removed comprises a playback progress bar.

The algorithms and displays provided here are not inherently related to any particular computer, virtual system or other equipment. Various general-purpose systems can also be used with the teaching based on this. Based on the above description, the structure required to construct this type of system is obvious. In addition, the present disclosure is not directed to any specific programming language. It should be understood that various programming languages can be used to implement the content of the present disclosure described herein, and the above description of a specific language is for the purpose of disclosing the best embodiment of the present disclosure.

In the instructions provided here, a lot of specific details are explained. However, it can be understood that the embodiments of the present disclosure may be practiced without these specific details. In some instances, well-known methods, structures, and technologies are not shown in detail, so as not to obscure the understanding of this specification.

Similarly, it should be understood that in order to simplify the present disclosure and help understand one or more of the various disclosed aspects, in the above description of the exemplary embodiments of the present disclosure, the various features of the present disclosure are sometimes grouped together into a single embodiment, figure, or its description. However, the disclosed method should not be interpreted as reflecting the intention that the claimed disclosure requires more features than those explicitly recorded in each claim. More precisely, as reflected in the following claims, the disclosure aspect lies in less than all the features of a single embodiment previously disclosed. Therefore, the claims following the specific embodiment are thus explicitly incorporated into the specific embodiment, wherein each claim itself serves as a separate embodiment of the present disclosure.

Those skilled in the art can understand that it is possible to adaptively change the modules in the device in the embodiment and set them in one or more devices different from the embodiment. The modules or units or components in the embodiments can be combined into one module or unit or component, and in addition, they can be divided into multiple sub-modules or sub-units or sub-components. Except that at least some of such features or processes or units are mutually exclusive, any combination can be used to compare all the features disclosed in this specification (including the accompanying claims, abstract and drawings) and any method or device thus disclosed. All processes or units are combined. Unless expressly stated otherwise, each feature disclosed in this specification (including the accompanying claims, abstract and drawings) may be replaced by an alternative feature providing the same, equivalent or similar purpose.

In addition, those skilled in the art can understand that although some embodiments herein include certain features included in other embodiments but not other features, the combination of features of different embodiments means that they are within the scope of the present disclosure and form different embodiments. For example, in the following claims, any one of the claimed embodiments can be used in any combination.

It should be noted that the above-mentioned embodiments illustrate rather than limit the present disclosure, and those skilled in the art can design alternative embodiments without departing from the scope of the appended claims. In the claims, any reference numbers placed between parentheses should not be constructed as a limitation to the claims. The word "comprising" does not exclude the presence of elements or steps not listed in the claims. The word "a" or "an" preceding an element does not exclude the presence of multiple such elements. The present disclosure can be realized by means of hardware including several different elements and by means of a suitably programmed computer. In the unit claims enumerating several devices, several of these devices may be embodied in the same hardware item. The use of the words first, second, and third, etc. do not indicate any order. These words can be interpreted as names.

What is claimed is:

1. A method for processing a screenshot, comprising:
   obtaining an image of at least one portion of a current page based on an instruction of screenshotting the at least one portion of the current page, wherein the current page comprises a plurality of image layers;
   determining whether the image comprises content to be removed based on at least one predetermined rule;
   in response to a determination that the image comprises the content to be removed, searching for a first element in a first image layer among the plurality image layer, the first element in the first image layer corresponding to the content to be removed;
   determining that a second element exists in a second image layer among the plurality of image layers based on a predetermined condition, wherein the second image layer is adjacent to and below the first image layer, and wherein the predetermined condition comprises in a direction perpendicular to the current page, a perpendicular projection area of the first element in the first image layer is located within a perpendicular projection area of the second element in the second image layer;
   performing a covering processing on the image by covering the content to be removed using the second element to obtain a processed image;
   wherein the method further comprises:
   in response to determining that the second element in the second image layer exists, determining whether a third element exists in a third image layer among the plurality of image layers, wherein the third image layer is located above the second image layer, and wherein the third element and the second element have an overlapping area in the direction perpendicular to the current page; and
   in response to determining that the third element in the third image layer does not exist, covering a corresponding portion of the image using the second element based on position information of the second element to obtain the processed image.

2. The method according to claim 1, further comprising:
   in response to determining that the third element in the third image layer exists, performing the covering processing on the image based at least in part on hierarchical information of the first image layer and the third image layer.

3. The method according to claim 2, further comprising:
   in response to determining that the third image layer is located above the first image layer or that the third image layer and the first image layer are in a same image layer, covering the corresponding position of the image using the second element based on the position of the second element, and then covering a corresponding portion of the second element using the third element based on position information of the third element to obtain the processed image.

4. The method according to claim 1, further comprising:
   in response to determining that the second element in the second image layer does not exist, determining that a fourth element exists in a fourth image layer among the plurality of image layers, wherein the fourth image layer is below the second image layer, and wherein the perpendicular projection area of the first element is located within a perpendicular projection area of the fourth element in the direction perpendicular to the current page, and wherein the fourth image layer is not a bottom image layer among the plurality of image layers; and
   covering a corresponding portion of the image using the fourth element based on position information of the fourth element.

5. The method according to claim 1, wherein the content to be removed comprises a movable content in the current page.

6. The method according to claim 1, wherein the content to be removed comprises a playback progress bar.

7. An electronic device, comprising: a processor, a memory, a communication interface and a communication bus, wherein the processor, the memory and the communication interface communicate with each other through the communication bus;
   wherein the memory is configured to store executable instructions that upon execution cause the at least one processor to perform operations, the operations comprising:
   obtaining an image of at least one portion of a current page based on an instruction of screenshotting the at least one portion of the current page, wherein the current page comprises a plurality of image layers;

determining whether the image comprises content to be removed based on at least one predetermined rule;

in response to a determination that the image comprises the content to be removed, searching for a first element in a first image layer among the plurality image layers, the first element in the first image layer corresponding to the content to be removed;

determining that a second element exists in a second image layer among the plurality of image layers based on a predetermined condition, wherein the second image layer is adjacent to and below the first image layer, and wherein the predetermined condition comprises in a direction perpendicular to the current page, a perpendicular projection area of the first element in the first image layer is located within a perpendicular projection area of the second element in the second image layer;

performing a covering processing on the image by covering the content to be removed using the second element in the second image layer to obtain a processed image;

wherein the operations further comprise:

in response to determining that the second element in the second image layer exists, determining whether a third element exists in a third image layer among the plurality of image layers, wherein the third image layer is located above the second image layer, and wherein the third element and the second element have an overlapping area in the direction perpendicular to the current page; and in response to determining that the third element in the third image layer does not exist, covering a corresponding portion of the image using the second element based on position information of the second element to obtain the processed image.

8. The electronic device according to claim 7, wherein the operations further comprise:

in response to determining that the third element in the third image layer exists, performing the covering processing on the image based at least in part on hierarchical information of the first image layer and the third image layer.

9. The electronic device according to claim 8, wherein the operations further comprise:

in response to determining that the third image layer is located above the first image layer or that the third image layer and the first image layer are in a same image layer, covering the corresponding position of the image using the second element based on the position of the second element, and then covering a corresponding portion of the second element using the third element based on position information of the third element to obtain the processed image.

10. The electronic device according to claim 7, wherein the operations further comprise:

in response to determining that the second element in the second image layer does not exist, determining that a fourth element exists in a fourth image layer among the plurality of image layers, wherein the fourth image layer is below the second image layer, and wherein the perpendicular projection area of the first element is located within a perpendicular projection area of the fourth element in the direction perpendicular to the current page, and wherein the fourth image layer is not a bottom image layer among the plurality of image layers; and covering a corresponding portion of the image using the fourth element based on position information of the fourth element.

11. The electronic device according to claim 7, wherein the content to be removed comprises a movable content in the current page.

12. The electronic device according to claim 7, wherein the content to be removed comprises a playback progress bar.

13. A non-volatile computer readable storage medium storing at least one executable instruction, wherein the executable instruction is configured to cause a processor to perform operations of:

obtaining an image of at least one portion of a current page based on an instruction of screenshotting the at least one portion of the current page, wherein the current page comprises a plurality of image layers;

determining whether the image comprises content to be removed based on at least one predetermined rule;

in response to a determination that the image comprises the content to be removed, searching for a first element in a first image layer among the plurality image layers, the first element corresponding to the content to be removed;

determining that a second element exists in a second image layer among the plurality of image layers based on a predetermined condition, wherein a second image layer is adjacent to and below the first image layer, and wherein the predetermined condition comprises a perpendicular projection area of the first element is located within a perpendicular projection area of the second element in a direction perpendicular to the current page;

performing a covering processing on the image by covering the content to be removed using the second element to obtain a processed image;

wherein the operations further comprise:

in response to determining that the second element in the second image layer exists, determining whether a third element exists in a third image layer among the plurality of image layers, wherein the third image layer is located above the second image layer, and wherein the third element and the second element have an overlapping area in the direction perpendicular to the current page; and in response to determining that the third element in the third image layer does not exist, covering a corresponding portion of the image using the second element based on position information of the second element to obtain the processed image.

14. The non-volatile computer readable storage medium according to claim 13, wherein the executable instruction is configured to further cause the processor to perform operations of:

in response to determining that the third element in the third image layer exists, performing the covering processing on the image based at least in part on hierarchical information of the first image layer and the third image layer.

15. The non-volatile computer readable storage medium according to claim 14, wherein the executable instruction is configured to further cause the processor to perform operations of:

in response to determining that the third image layer is located above the first image layer or that the third image layer and the first image layer are in a same image layer, covering the corresponding position of the image using the second element based on the position of the second element, and then covering a corresponding portion of the second element using the third element based on position information of the third element to obtain the processed image.

16. The non-volatile computer readable storage medium according to claim 13, wherein the executable instruction is configured to further cause the processor to perform operations of:

in response to determining that the second element in the second image layer does not exist, determining that a fourth element exists in a fourth image layer among the plurality of image layers, wherein the fourth image layer is below the second image layer, and wherein the perpendicular projection area of the first element is located within a perpendicular projection area of the fourth element in the direction perpendicular to the current page, and wherein the fourth image layer is not a bottom image layer among the plurality of image layers; and covering a corresponding portion of the image using the fourth element based on position information of the fourth element.

17. The non-volatile computer readable storage medium according to claim 13, wherein the content to be removed comprises a playback progress bar.

* * * * *